(12) United States Patent (10) Patent No.: US 12,581,152 B2

Zhuang (45) Date of Patent: Mar. 17, 2026

(54) SAME-SCREEN INTERACTION CONTROL METHOD AND APPARATUS, AND ELECTRONIC DEVICE AND NON-TRANSITORY STORAGE MEDIUM

(71) Applicant: Guangzhou Boguan Telecommunication Technology Co., Ltd., Guangzhou (CN)

(72) Inventor: Yuxuan Zhuang, Guangzhou (CN)

(73) Assignee: Guangzhou Boguan Telecommunication Technology Co., Ltd., Guangzhou City (CN)

( * ) Notice: Subject to any disclaimer, the term of this patent is extended or adjusted under 35 U.S.C. 154(b) by 212 days.

(21) Appl. No.: 18/291,606

(22) PCT Filed: Apr. 12, 2022

(86) PCT No.: PCT/CN2022/086257

§ 371 (c)(1),
(2) Date: Jan. 24, 2024

(87) PCT Pub. No.: WO2023/019982

PCT Pub. Date: Feb. 23, 2023

(65) Prior Publication Data

US 2024/0259627 A1 Aug. 1, 2024

(30) Foreign Application Priority Data

Aug. 17, 2021 (CN) .......................... 202110943983.2

(51) Int. Cl.
*H04N 21/431* (2011.01)
*H04N 21/2187* (2011.01)
(Continued)

(52) U.S. Cl.
CPC ..... *H04N 21/4312* (2013.01); *H04N 21/2187* (2013.01); *H04N 21/233* (2013.01);
(Continued)

(58) Field of Classification Search
CPC ........... H04N 21/4312; H04N 21/2187; H04N 21/233; H04N 21/242; H04N 21/8453;
(Continued)

(56) References Cited

U.S. PATENT DOCUMENTS

| | | | |
|---|---|---|---|
| 12,267,533 B2 * | 4/2025 | Cormican .......... | H04N 21/8146 |
| 2010/0042682 A1 * | 2/2010 | Kaye .................. | H04N 21/4788 |
| | | | 709/203 |

(Continued)

FOREIGN PATENT DOCUMENTS

| | | |
|---|---|---|
| CN | 106803966 A | 6/2017 |
| CN | 107750014 A | 3/2018 |

(Continued)

OTHER PUBLICATIONS

Notice of Allowance dated Feb. 29, 2024 for Chinese Application No. 202110943983.2.

(Continued)

*Primary Examiner* — Oschta I Montoya

(74) *Attorney, Agent, or Firm* — Qinghong Xu

(57) ABSTRACT

Provided are a same-screen interaction control method, an electronic device and a storage medium. The same-screen interaction control method includes: determining a same-screen interaction receiver who responds to an initiation request; calling a virtual scene template corresponding to the initiation request, and establishing a target virtual scene corresponding to the virtual scene template; acquiring a first key image, and a second key image corresponding to the same-screen interaction receiver; performing splicing processing on the first key image and the second key image by means of the target virtual scene, so as to obtain a same-screen interaction scene, and generating a same-screen live broadcast video stream corresponding to the same-screen interaction scene; and sending the same-screen live broad-
(Continued)

cast video stream to a server, so as to synchronize the same-screen live broadcast video stream to a live broadcast client by means of the server.

11 Claims, 6 Drawing Sheets

(51) Int. Cl.

| | |
|---|---|
| *H04N 21/233* | (2011.01) |
| *H04N 21/242* | (2011.01) |
| *H04N 21/845* | (2011.01) |
| *H04N 21/8545* | (2011.01) |

(52) U.S. Cl.
CPC ....... *H04N 21/242* (2013.01); *H04N 21/8453* (2013.01); *H04N 21/8545* (2013.01)

(58) Field of Classification Search
CPC ........... H04N 21/8545; H04N 21/4781; H04N 21/4788; H04N 21/23412; H04N 21/23424; Y02D 30/70
See application file for complete search history.

(56) References Cited

U.S. PATENT DOCUMENTS

| | | | | |
|---|---|---|---|---|
| 2014/0282677 A1* | 9/2014 | Mantell | ................ | H04N 21/435 |
| | | | | 725/23 |
| 2017/0163900 A1* | 6/2017 | Gaetje | ..................... | G02C 7/12 |
| 2017/0180626 A1* | 6/2017 | Hayashi | ............... | H04N 23/661 |
| 2018/0152736 A1* | 5/2018 | Alexander | ......... | H04N 21/6587 |
| 2020/0106952 A1* | 4/2020 | Missig | ................... | H04N 7/141 |
| 2021/0337246 A1* | 10/2021 | Crowe | ............ | H04N 21/21805 |
| 2024/0340501 A1* | 10/2024 | Ichinose | ............. | H04N 21/437 |

FOREIGN PATENT DOCUMENTS

| | | | |
|---|---|---|---|
| CN | 107911724 | A | 4/2018 |
| CN | 109874021 | A | 6/2019 |
| CN | 110519611 | A | 11/2019 |
| CN | 111641844 | A | 9/2020 |
| CN | 111694429 | A | 9/2020 |
| CN | 112040270 | A | 12/2020 |
| CN | 112153400 | A | 12/2020 |
| CN | 112616063 | A | 4/2021 |
| CN | 113660503 | A | 11/2021 |
| WO | 2018045927 | A1 | 3/2018 |
| WO | 2020165885 | A1 | 8/2020 |

OTHER PUBLICATIONS

1st Office Action dated May 31, 2023 of Chinese Application No. 202110943983.2.
International Search Report dated Jun. 6, 2022 of International Application No. PCT/CN2022/086257.

\* cited by examiner

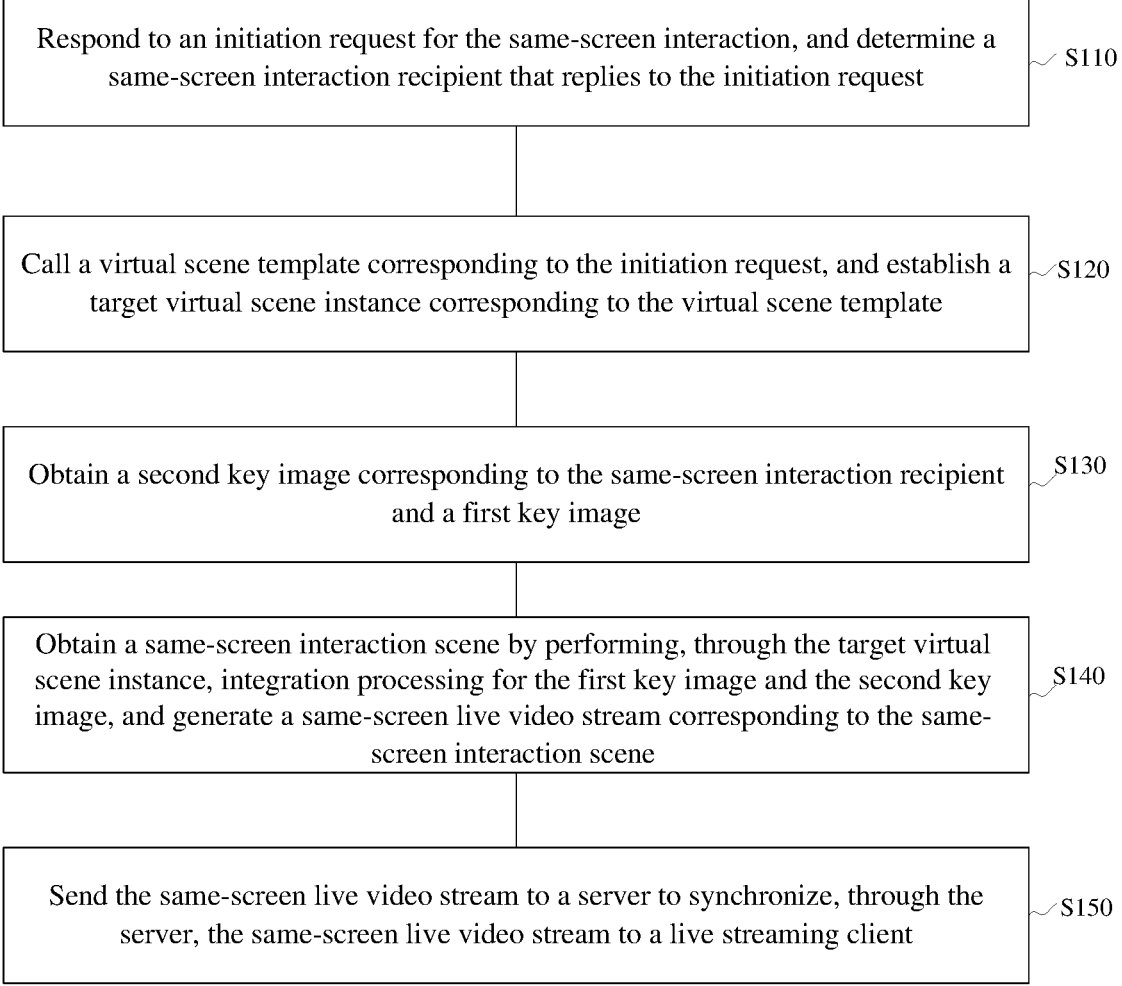

Respond to an initiation request for the same-screen interaction, and determine a same-screen interaction recipient that replies to the initiation request — S110

Call a virtual scene template corresponding to the initiation request, and establish a target virtual scene instance corresponding to the virtual scene template — S120

Obtain a second key image corresponding to the same-screen interaction recipient and a first key image — S130

Obtain a same-screen interaction scene by performing, through the target virtual scene instance, integration processing for the first key image and the second key image, and generate a same-screen live video stream corresponding to the same-screen interaction scene — S140

Send the same-screen live video stream to a server to synchronize, through the server, the same-screen live video stream to a live streaming client — S150

FIG. 1

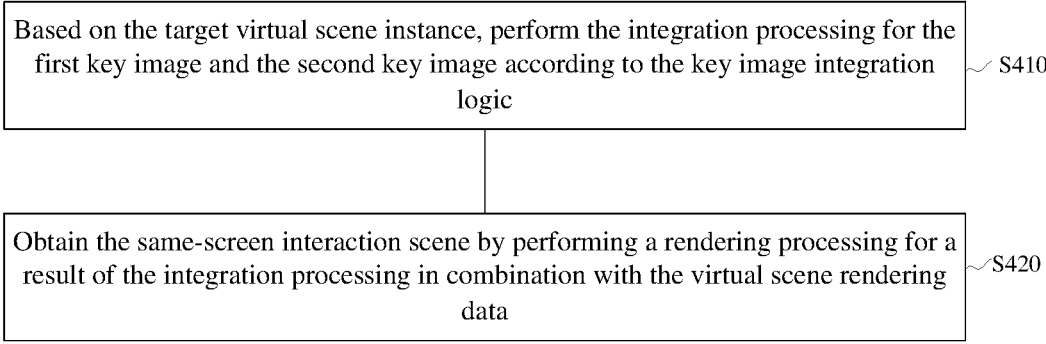

Based on the target virtual scene instance, perform the integration processing for the first key image and the second key image according to the key image integration logic — S410

Obtain the same-screen interaction scene by performing a rendering processing for a result of the integration processing in combination with the virtual scene rendering data — S420

FIG. 4

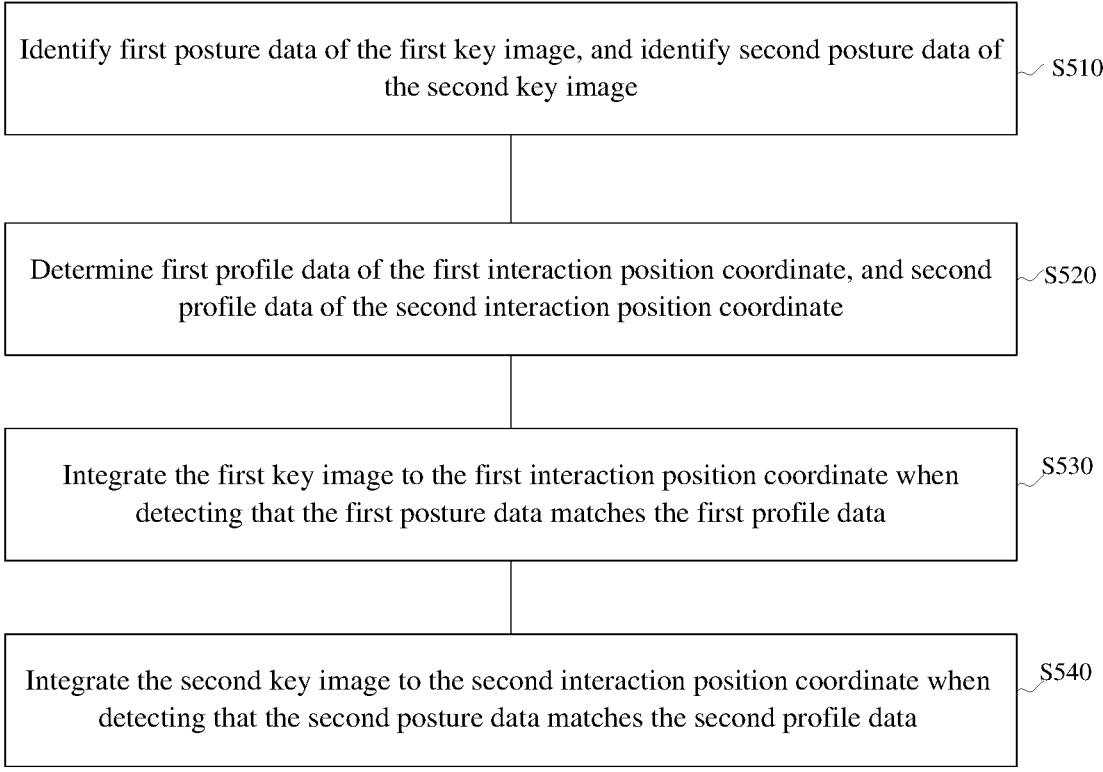

Identify first posture data of the first key image, and identify second posture data of the second key image — S510

Determine first profile data of the first interaction position coordinate, and second profile data of the second interaction position coordinate — S520

Integrate the first key image to the first interaction position coordinate when detecting that the first posture data matches the first profile data — S530

Integrate the second key image to the second interaction position coordinate when detecting that the second posture data matches the second profile data — S540

FIG. 5

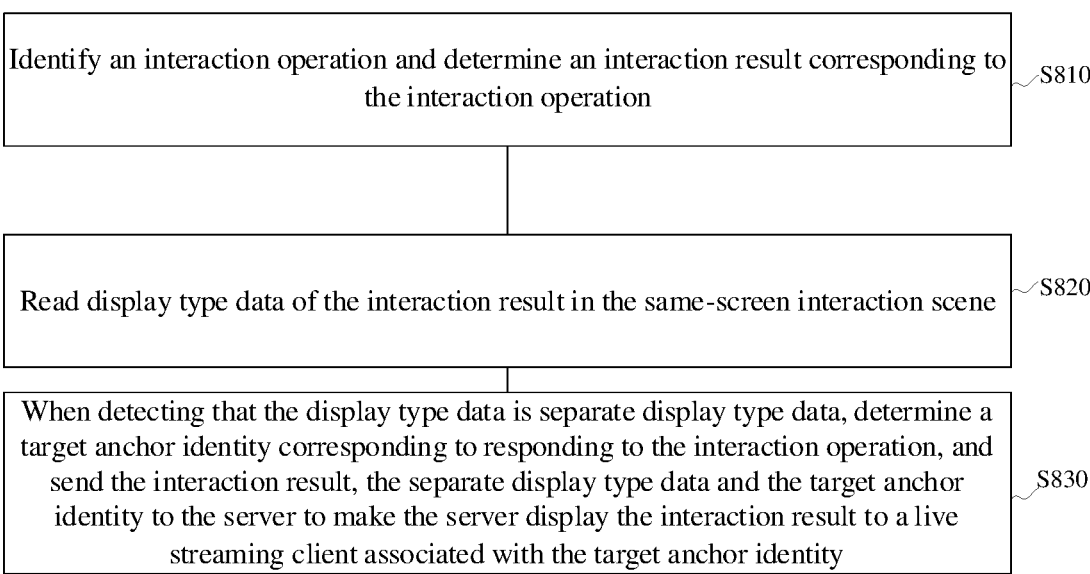

Identify an interaction operation and determine an interaction result corresponding to the interaction operation   S810

Read display type data of the interaction result in the same-screen interaction scene   S820

When detecting that the display type data is separate display type data, determine a target anchor identity corresponding to responding to the interaction operation, and send the interaction result, the separate display type data and the target anchor identity to the server to make the server display the interaction result to a live streaming client associated with the target anchor identity   S830

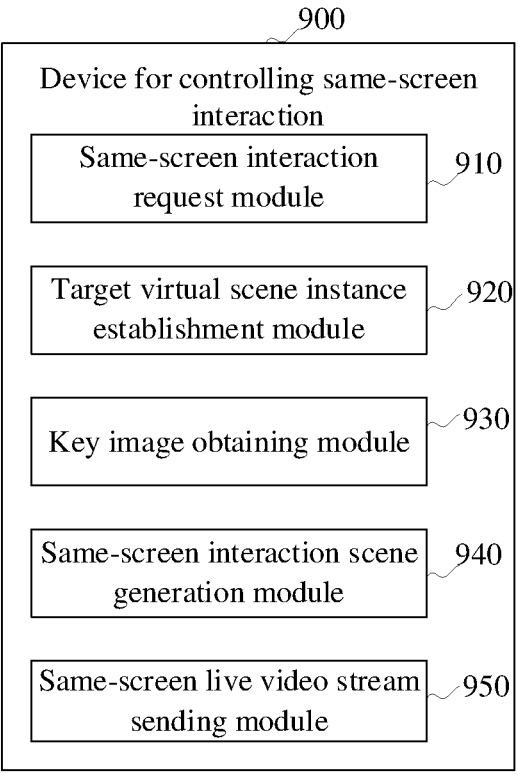

Device for controlling same-screen interaction

Same-screen interaction request module   910

Target virtual scene instance establishment module   920

Key image obtaining module   930

Same-screen interaction scene generation module   940

Same-screen live video stream sending module   950

FIG. 9

SAME-SCREEN INTERACTION CONTROL METHOD AND APPARATUS, AND ELECTRONIC DEVICE AND NON-TRANSITORY STORAGE MEDIUM

CROSS-REFERENCE TO RELATED APPLICATION

The present disclosure is a U.S. National Stage Application of International Application No. PCT/CN2022/086257, filed on Apr. 12, 2022, which is based upon and claims the priority to the Chinese Patent Application NO. 202110943983.2, entitled "SAME-SCREEN INTERACTION CONTROL METHOD AND APPARATUS, AND ELECTRONIC DEVICE AND STORAGE MEDIUM", filed on Aug. 17, 2021, the entire contents of both of which are incorporated herein by reference for all purposes.

TECHNICAL FIELD

The present disclosure relates to the field of computer technologies, and in particular to a method for controlling same-screen interaction, a device for controlling same-screen interaction, an electronic device, and a non-transitory computer-readable storage medium.

BACKGROUND

With the rapid development of Internet technologies, live streaming activities are becoming increasingly diverse, especially live streaming activities based on virtual scenes are becoming increasingly popular.

It should be noted that the information disclosed in the background section above is only used to enhance the understanding of the background of the present disclosure, and therefore may include information that does not constitute the prior art known to those skilled in the art.

SUMMARY

According to a first aspect of the present disclosure, there is provided a method for controlling same-screen interaction, including: responding to an initiation request for the same-screen interaction, and determining a same-screen interaction recipient, wherein the same-screen interaction recipient replies to the initiation request; calling a virtual scene template corresponding to the initiation request, and establishing a target virtual scene corresponding to the virtual scene template; obtaining a second key image corresponding to the same-screen interaction recipient and a first key image; obtaining a same-screen interaction scene by performing, through the target virtual scene, integration processing for the first key image and the second key image, and generating a same-screen live video stream corresponding to the same-screen interaction scene; and sending the same-screen live video stream to a server to synchronize, through the server, the same-screen live video stream to a live streaming client.

According to a second aspect of the present disclosure, there is provided an electronic device, including: a processor; and a memory having computer-readable instructions stored thereon, wherein the computer-readable instructions, when executed by the processor, implement the method for controlling the same-screen interaction described in any of the above embodiments.

According to a third aspect of the present disclosure, there is provided a non-transitory computer-readable storage medium having a computer program stored thereon, wherein the computer program, when executed by a processor, implements the method for controlling the same-screen interaction described in any of the above embodiments.

It should be understood that the above general description and the following detailed description are merely exemplary and explanatory; and should not limit the present disclosure.

BRIEF DESCRIPTION OF THE DRAWINGS

The drawings herein are incorporated in and constitute a part of the specification, illustrate embodiments consistent with the present disclosure, and together with the description serve to explain principles of the present disclosure. Apparently, the drawings in the following description are only some embodiments of the present disclosure. For those of ordinary skill in the art, other drawings may be obtained based on these drawings without paying any creative effort. In the drawings:

FIG. 1 schematically shows a schematic diagram of a flow of a method for controlling same-screen interaction according to some embodiments of the present disclosure;

FIG. 4 schematically shows a schematic diagram of a flow of a method for generating a same-screen interaction scene according to some embodiments of the present disclosure;

FIG. 5 schematically shows a schematic diagram of a flow of a method for integrating a key image according to some embodiments of the present disclosure;

FIG. 8 schematically shows a schematic diagram of a flow of a method for processing an interaction result according to some embodiments of the present disclosure;

FIG. 9 schematically shows a schematic diagram of a device for controlling same-screen interaction according to some embodiments of the present disclosure;

In the drawings, the same or corresponding reference numerals represent the same or corresponding parts

DETAILED DESCRIPTION

Figure 2:
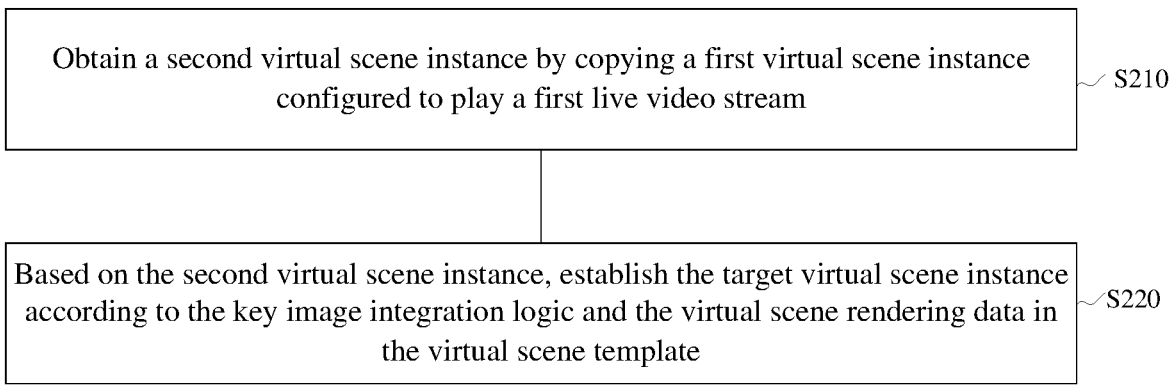
FIG. 2 schematically shows a schematic diagram of a flow of a method for establishing a target virtual scene instance according to some embodiments of the present disclosure.

Example embodiments will now be described more fully with reference to the accompanying drawings. However, the example embodiments may be implemented in a variety of forms and should not be construed as being limited to examples set forth herein; rather, these embodiments are provided so that the present disclosure will be more complete and comprehensive so as to convey the spirit of the example embodiments to those skilled in this art.

In addition, the described features, structures, or characteristics may be combined in any suitable manner in one or more embodiments. In the description below, numerous specific details are set forth to provide a thorough understanding of embodiments of the present disclosure. However, those skilled in the art will appreciate that the technical solution of the present disclosure may be practiced without one or more of the specific details, or other methods, components, devices, steps and the like may be employed. In other instances, well-known methods, devices, implementations or operations are not shown or described in detail to avoid obscuring various aspects of the present disclosure.

In addition, the drawings are merely schematic illustrations of the present disclosure and are not necessarily drawn to scale. The block diagrams shown in the figures are only functional entities and do not necessarily correspond to physically separate entities. In other words, these functional entities may be implemented in software, or implemented in one or more hardware modules or integrated circuits, or implemented in different networks and/or processor devices and/or microcontroller devices.

With the rapid development of Internet technologies, live streaming activities are becoming increasingly diverse, especially live streaming activities based on virtual scenes are becoming increasingly popular. How to improve the diversity of interactive activities in virtual live streaming scenes has become a new challenge in the field of live streaming.

However, in the related virtual live streaming scenes, only one scene instance can be rendered at the same time, which makes it impossible for a plurality of anchors to perform same-screen interaction in the same virtual scene, and for users to interact with anchors in a plurality of live rooms, making a form of interaction in the virtual live streaming scene relatively simple, and the interactive experience of the users in the virtual live streaming scene poor.

In the method for controlling the same-screen interaction provided in the present disclosure, the initiation request for the same-screen interaction is responded, and the same-screen interaction recipient that replies to the initiation request is determined; the virtual scene template corresponding to the initiation request is called, and the target virtual scene instance corresponding to the virtual scene template is established; the second key image corresponding to the same-screen interaction recipient and the first key image are obtained; the integration processing is performed for the first key image and the second key image through the target virtual scene instance to obtain the same-screen interaction scene, and the same-screen live video stream corresponding to the same-screen interaction scene is generated; and the same-screen live video stream is sent to the server to synchronize the same-screen live video stream to the live streaming client through the server. On the one hand, the virtual scene template corresponding to the initiation request for the same-screen interaction can be called, and the target virtual scene instance corresponding to the virtual scene template can be established, and the first key image and the second key image are integrated together through the target virtual scene instance to generate the same-screen interaction scene, and in turn obtain, through rendering, a picture where a plurality of same-screen interaction participants perform same-screen interaction in the same virtual scene, which improves the diversity of the virtual live streaming scene; on the other hand, the same-screen live video stream can be generated and the same-screen live video stream is synchronized to the live streaming client through the server, so that a user of the live streaming client can watch the live streaming of the plurality of participants in the same-screen interaction scene at the same time, which improves a use experience of the user watching the virtual live streaming scene.

In embodiments of the present disclosure, there is first provided a method for controlling same-screen interaction, which may be applied to a terminal device, such as a computer terminal, a mobile terminal or the like. FIG. 1 schematically shows a schematic diagram of a flow of a method for controlling same-screen interaction according to some embodiments of the present disclosure. Referring to FIG. 1, the method for controlling the same-screen interaction may include steps S110 to S150.

In the step S110, an initiation request for the same-screen interaction is responded, and a same-screen interaction recipient that replies to the initiation request is determined.

In the step S120, a virtual scene template corresponding to the initiation request is called, and a target virtual scene instance corresponding to the virtual scene template is established.

In the step S130, a first key image and a second key image corresponding to the same-screen interaction recipient are obtained.

In the step S140, integration processing is performed for the first key image and the second key image through the target virtual scene instance to obtain a same-screen interaction scene, and a same-screen live video stream corresponding to the same-screen interaction scene is generated.

In the step S150, the same-screen live video stream is sent to a server to synchronize the same-screen live video stream to a live streaming client through the server.

According to the method for controlling the same-screen interaction in embodiments of the present disclosure, on the one hand, the virtual scene template corresponding to the initiation request for the same-screen interaction can be called, and the target virtual scene instance corresponding to the virtual scene template can be established, and the first key image and the second key image are integrated together through the target virtual scene instance to generate the same-screen interaction scene, and in turn obtain, through rendering, a picture where a plurality of same-screen interaction participants perform same-screen interaction in the same virtual scene, which improves the diversity of the virtual live streaming scene; on the other hand, the same-screen live video stream can be generated and the same-screen live video stream is synchronized to the live streaming client through the server, so that a user of the live streaming client can watch the live streaming of the plurality of participants in the same-screen interaction scene at the same time, which improves a use experience of the user watching the virtual live streaming scene.

The method for controlling the same-screen interaction in embodiments of the present disclosure will be further illustrated in the following.

In the step S110, the initiation request for the same-screen interaction is responded, and the same-screen interaction recipient that replies to the initiation request is determined.

In an example of the present disclosure, the initiation request may refer to a request containing information related to the same-screen interaction. For example, the initiation request may be a request containing interaction mode information of the same-screen interaction, or a request containing anchor account information of a same-screen interaction initiator. Alternatively, the initiation request may also be a request containing other key information for the same-screen interaction, which is not specifically limited by embodiments of the present disclosure.

A same-screen interaction portal, such as a same-screen interaction control, may be provided on the live streaming client. When a user's trigger operation on the same-screen interaction control is detected, that is, the initiation request for the same-screen interaction is detected, the initiation request corresponding to the same-screen interaction portal will be sent to other anchor ends associated with an anchor end that initiates the same-screen interaction. Upon receiving the same-screen interaction request, other anchor ends may choose to join the same-screen interaction, and then all participants joining in the same-screen interaction may be determined.

In the step S120, the virtual scene template corresponding to the initiation request is called, and the target virtual scene instance corresponding to the virtual scene template is established.

In an example of the present disclosure, the virtual scene template may include template data for generating the same-screen interaction scene corresponding to the same-screen interaction request. For example, the virtual scene template may include virtual scene rendering data for generating the same-screen interaction scene corresponding to the same-screen interaction request. The virtual scene template may also include a integration logic for integrating key images in the same-screen interaction scene corresponding to the same-screen interaction request. Alternatively, the virtual scene template may also include other template data for generating the same-screen interaction scene corresponding to the same-screen interaction request, which is not particularly limited in embodiments of the present disclosure.

The target virtual scene instance may refer to underlying data for displaying the same-screen interaction scene. For example, the target virtual scene instance may be a window for displaying the same-screen interaction scene, and the target virtual scene instance may also be a process for displaying the same-screen interaction scene. Alternatively, the target virtual scene instance may also be other underlying data for displaying the same-screen interaction scene, which is not specifically limited in embodiments of the present disclosure.

The virtual scene template corresponding to a same-screen interactive gameplay may be called from the server and the target virtual scene instance for displaying the same-screen interaction scene is established, so as to integrate, through the target virtual scene instance, the key images of a plurality of same-screen interaction participants in the same-screen interaction scene, thereby obtaining the same-screen interaction scene.

In the step S130, the first key image and the second key image corresponding to the same-screen interaction recipient are obtained.

The first key image may refer to a character image in the virtual scene of the same-screen interaction initiation party and captured by a virtual camera. The second key image may refer to a character image in the virtual scene of the same-screen interaction recipient and captured by the virtual camera.

In a virtual live streaming scene, a camera in a terminal device of the same-screen interaction initiator may capture anchor image data of the same-screen interaction initiator, and then the anchor image data may be sent to an initial virtual scene instance of the same-screen interaction initiator, so that the virtual camera in an initial virtual scene corresponding to the initial virtual scene instance can capture the anchor image data with a filter effect, thereby obtaining the first key image. The initial virtual scene instance may be underlying data for displaying a current live data stream containing a virtual scene. For example, the initial virtual scene instance may be a window for displaying the current live data stream containing the virtual scene, or a process for displaying the current live data stream containing the virtual scene. The process of displaying the current live data stream including the virtual scene. Alternatively, the initial virtual scene instance may also be used to display other underlying data containing the virtual scene instance, which is not specifically limited in embodiments of the present disclosure. Likewise, the anchor image data of the same-screen interaction recipient may also be collected through a camera in a terminal device of the same-screen interaction recipient, and the anchor image data of the same-screen interaction recipient may be transmitted to an initial virtual scene instance of the same-screen interaction recipient. The second key image with the filter effect in the initial virtual scene is obtained through a virtual camera in the initial virtual scene corresponding to the initial virtual scene instance. After the first key image and the second key image are obtained, the integration processing may be performed for the first key image and the second key image through the target virtual scene instance to obtain the same-screen interaction scene.

In the step S140, the integration processing is performed for the first key image and the second key image through the target virtual scene instance to obtain the same-screen interaction scene, and the same-screen live video stream corresponding to the same-screen interaction scene is generated.

In an example of the present disclosure, the same-screen interaction scene may refer to an interaction scene displayed by the target virtual scene instance. For example, the same-screen interaction scene may be an interaction scene displayed by the target virtual scene instance and containing a virtual scene rendered based on virtual scene rendering data, as well as the integrated first key image and second key image. The same-screen interaction scene may also be an interaction scene displayed by the target virtual scene instance and containing an additional virtual prop in the virtual scene template. Alternatively, the same-screen interaction scene may also be an interaction scene displayed by the target virtual scene instance and containing other objects, which is not specifically limited in embodiments of the present disclosure.

The key image integration logic in the virtual scene template may be read through the target virtual scene instance, and the integration processing may be performed for the first key image and the second key image according to the key image integration logic to obtain the same-screen interaction scene. In addition, an audio data stream of the same-screen interaction initiator is collected, an audio data stream of the same-screen interaction recipient is obtained, and the audio data stream of the same-screen interaction initiator and the audio data stream of the same-screen interaction recipient are synchronized to the same-screen interaction scene through the target virtual scene instance to generate a same-screen live video stream.

In the step S150, the same-screen live video stream is sent to the server to synchronize the same-screen live video stream to the live streaming client through the server.

In an example of the present disclosure, the same-screen live video stream may refer to a live video stream obtained by synchronizing the audio data streams of the same-screen interaction participants to the same-screen interaction scene through the target virtual scene instance.

The same-screen live video stream containing the image data and the audio data of a plurality of same-screen interaction participants in the same virtual scene may be sent to the server, and the same-screen live video stream may be synchronized, through the server, to live rooms of respective same-screen interaction participants and living streaming clients establishing connections with the respective live rooms, so that clients entering the live rooms of the respective same-screen interaction participants can also watch the same-screen live video stream and interact with the same-screen interaction participants in the same-screen live video stream, improving the diversity of the virtual live streaming, and enabling the user to watch live streaming behaviors of the plurality of same-screen interaction participants in the same virtual scene at the same time, improving the use experience of the user watching the live streaming. The user may also select a target participant from the plurality of same-screen interaction participants as an interaction target and directly interact with the selected target participant, which improves the fun of the live streaming interaction in the same-screen interaction scene.

In an example embodiment of the present disclosure, the key image integration logic and the virtual scene rendering data in the virtual scene template may be read, and the key image integration logic may be used for the integration processing of the first key image and the second key image, and the key image integration logic can be used to integrate the first key image and the second key image, and the virtual scene rendering data may be used to render the same-screen interaction scene.

The key image integration logic can refer to a logic for integrating the key images. For example, the key image integration logic may be a logic for determining a integration position of the key image in the same-screen interaction scene. Alternatively, the key image integration logic may also be other logics for integrating the key images, which is not specifically limited by embodiments of the present disclosure.

The virtual scene rendering data may refer to data for rendering the same-screen interaction scene. For example, the virtual scene rendering data may be virtual scene data for rendering the same-screen interaction scene, or data for adjusting the filter effect of the same-screen interaction scene. Alternatively, the virtual scene rendering data may also be other data for rendering the same-screen interaction scene, such as virtual scene prop data, which is not specifically limited by embodiments of the present disclosure.

Through the target virtual scene instance, the first key image and the second key image may be integrated according to the key image integration logic, and the integrated first key image and second key image may be rendered in combination with the virtual scene rendering data to obtain the same-screen interaction scene.

FIG. 2 schematically shows a schematic diagram of a flow of a method for establishing a target virtual scene instance according to some embodiments of the present disclosure. Referring to FIG. 2, the method for establishing the target virtual scene instance may include steps S210 to S220.

In the step S210, a first virtual scene instance configured to play a first live video stream is copied to obtain a second virtual scene instance.

In the step S220, based on the second virtual scene instance, the target virtual scene instance is established according to the key image integration logic and the virtual scene rendering data in the virtual scene template.

The first live video stream may refer to a video stream currently being live broadcast by the same-screen interaction initiator. For example, the same-screen interaction initiator initiates a chess and card game, and the first live video stream may be a video stream of the chess and card game currently being played in the virtual live room of the same-screen interaction initiator. Alternatively, the first live video stream may also be other video streams currently being played by the same-screen interaction initiator, which is not specifically limited by embodiments of the present disclosure.

The first virtual scene instance may refer to underlying data for displaying a virtual scene corresponding to the first live video stream. For example, the first virtual scene instance may be a window for displaying the virtual scene corresponding to the first live video stream, or a process for displaying the virtual scene corresponding to the first live video stream. Alternatively, the first virtual scene instance may also be other underlying data for displaying the virtual scene corresponding to the first live video stream, which is not specifically limited by embodiments of the present disclosure. The second virtual scene instance may refer to a copy of the first virtual scene instance.

Since the first virtual scene instance includes key data of the virtual scene corresponding to the first live video stream, for example, the first virtual scene instance includes the virtual prop data, the first key image, the filter effect, and the virtual scene corresponding to the first live video stream, etc., the first virtual scene instance may be copied to obtain the second virtual scene instance, and the target virtual scene instance may be established according to the key image integration logic and the virtual scene rendering data in the virtual scene template, so as to use the target virtual scene instance for the integration of the key images in the same-screen interaction scene, and in turn generate the same-screen interaction scene.

Likewise, other same-screen interaction recipients also need to copy the virtual scene instances used to play their respective current live video streams, and transmit the key data (e.g., key images, filter effects, and virtual prop data) in the copied virtual scene instances to the target virtual scene instance, so that the key images of the same-screen interaction recipients are integrated, through the target virtual scene instance, into the same virtual scene as the first key image to obtain the same-screen interaction scene.

Figure 3:
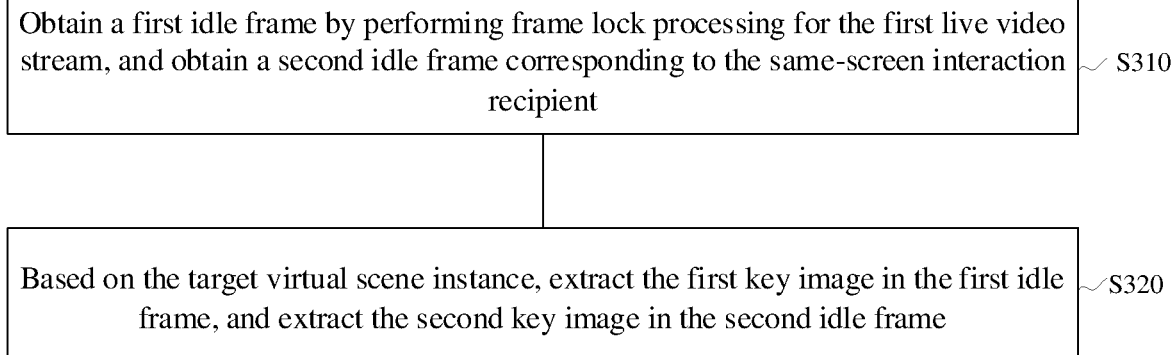
FIG. 3 schematically shows a schematic diagram of a flow of a method for generating a target virtual scene instance according to some embodiments of the present disclosure.

FIG. 3 schematically shows a schematic diagram of a flow of a method for generating a target virtual scene instance according to some embodiments of the present disclosure. Referring to FIG. 3, the method for generating the target virtual scene instance may include steps S310 and S320.

In the step S310, frame lock processing is performed for the first live video stream to obtain a first idle frame, and a second idle frame corresponding to the same-screen interaction recipient is obtained.

In the step S320, based on the target virtual scene instance, the first key image in the first idle frame is extracted, and the second key image in the second idle frame is extracted.

The frame lock processing may be performed for the first live video stream. For example, the first live video stream plays 90 frames of the picture per second, and 30 frames may be extracted from 90 frames of the picture as the first idle frame for the integration of the key images in the same-screen interaction scene, without affecting the normal playback and viewing of the first live video stream. Likewise, the frame lock processing may be performed, through the terminal of the same-screen interaction recipient, for the live video stream being currently played, and the same idle frame as the frame data of the first idle frame is extracted, as the second idle frame, from the frames played every second.

The key image of the first idle frame and the key image of the second idle frame may be extracted through the target virtual scene instance, and the key image extracted from the first idle frame is used as the first key image, and the key image extracted from the second idle frame is used as the second key image.

FIG. 4 schematically shows a schematic diagram of a flow of a method for generating a same-screen interaction scene according to some embodiments of the present disclosure. Referring to FIG. 4, the method for generating the same-screen interaction scene may include steps S410 and S420.

In the step S410, based on the target virtual scene instance, the integration processing is performed for the first key image and the second key image according to the key image integration logic.

In the step S420, a rendering processing is performed for a result of the integration processing in combination with the virtual scene rendering data to obtain the same-screen interaction scene.

A first interaction position coordinate in the same-screen interaction scene of the first key image and a second interaction position coordinate in the same-screen interaction scene of the second key image may be determined by reading the key image integration logic through the target virtual scene instance, and the first key image and the second key image are integrated based on the first interaction position coordinate and the second interaction position coordinate. Alternatively, posture data of the first key image and posture data of the second key image may be read, and based on the key image integration logic, the first key image is integrated to an interaction position that matches the posture data of the first key image, and the second key image is integrated to an interaction position that matches the posture data of the second key image, thereby realizing the integration of the first key image and the second key image.

After the integration of the first key image and the second key image is completed, the integrated first key image and second key image may be rendered in combination with the virtual scene rendering data through the target virtual scene instance, so as to obtain the same-screen interaction scene containing the first key image and the second key image.

In an example embodiment of the present disclosure, based on the target virtual scene instance, the first interaction position coordinate of the first key image and the second interaction position coordinate of the second key image are determined according to the key image integration logic; and the integration processing is performed for the first key image and the second key image through the first interaction position coordinate and the second interaction position coordinate.

The first interaction position coordinate may refer to three-dimensional coordinates for determining a integration position of the first key image in the same-screen interaction scene. The second interaction position coordinate may refer to three-dimensional coordinates for determining a integration position of the second key image in the same-screen interaction scene.

The first interaction position coordinate of the first key image and the second interaction position coordinate of the second key image may be determined according to the key image integration logic in the virtual scene template; and through the target virtual scene instance, the first key image is integrated to the first interaction position coordinate, and the second key image is integrated to the second interaction position coordinate, realizing the integration processing of the first key image and the second key image.

FIG. 5 schematically shows a schematic diagram of a flow of a method for integrating a key image according to some embodiments of the present disclosure. Referring to FIG. 5, the method for integrating the key image may include steps S510 to S540.

In the step S510, the first posture data of the first key image is identified, and the second posture data of the second key image is identified.

In the step S520, first profile data of the first interaction position coordinate is determined, and second profile data of the second interaction position coordinate is determined.

In the step S530, when it is detected that the first posture data matches the first profile data, the first key image is integrated to the first interaction position coordinate.

In the step S540, when it is detected that the second posture data matches the second profile data, the second key image is integrated to the second interaction position coordinate.

The first posture data may refer to three-dimensional profile data corresponding to a body posture of a character in the first key image. For example, the body posture of the character in the first key image may be a standing posture, and the first posture data may be the three-dimensional profile data corresponding to the standing posture of the character in the first key image. The body posture of the character in the first key image may also be a sitting cross-legged posture. The first posture data may also be three-dimensional profile data corresponding to the sitting cross-legged posture of the character in the first key image. Alternatively, the first posture data may also be three-dimensional profile data corresponding to other body postures of the character in the first key image, which is not specifically limited in embodiments of the present disclosure.

The second posture data may refer to three-dimensional profile data corresponding to a body posture of a character in the second key image. For example, the body posture of the character in the second key image may be a crouched-sitting posture, and the second posture data may be three-dimensional profile data corresponding to the crouched-sitting posture of the character in the second key image. The body posture of the character in the second key image may also be a squatting posture, and the second posture data may be three-dimensional profile data corresponding to the squatting posture of the character in the second key image. Alternatively, the second posture data may also be three-dimensional profile data corresponding to other body postures of the character in the second key image, which is not specifically limited in embodiments of the present disclosure. The first profile data may refer to three-dimensional profile data composed of coordinate points corresponding to the first interaction position coordinate. The second profile data may refer to three-dimensional profile data composed of coordinate points corresponding to the second interaction position coordinate.

It may be detected whether the first profile data corresponding to the first interaction position coordinate of the first key image matches the first posture data of the first key image, and whether the second profile data corresponding to the second interaction position coordinate of the second key image matches the second posture data of the second key image. If it is detected that the first profile data matches the first posture data, the first key image may be integrated to the first interaction position through the target virtual scene instance. Likewise, if it is detected that the second profile data matches the second posture data, the second key image may be integrated to the second interaction position through the target virtual scene instance. Accordingly, the integration of the first key image and the second key image can be achieved.

Figure 6:
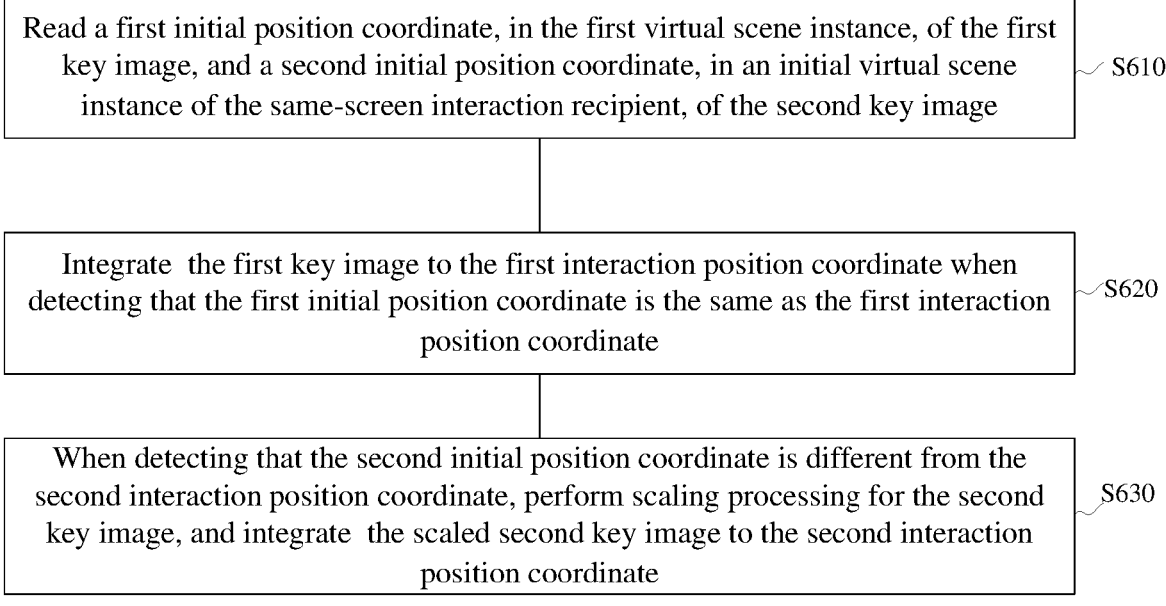
FIG. 6 schematically shows a schematic diagram of a flow of another method for integrating a key image according to some embodiments of the present disclosure.

FIG. 6 schematically shows a schematic diagram of a flow of another method for integrating a key image according to some embodiments of the present disclosure. Referring to FIG. 6, the method for integrating the key image may include steps S610 to S630.

In the step S610, a first initial position coordinate in the first virtual scene instance of the first key image is read, and a second initial position coordinate, in an initial virtual scene instance of the same-screen interaction recipient, of the second key image is read.

In the step S620, when it is detected that the first initial position coordinate is the same as the first interaction position coordinate, the first key image is integrated to the first interaction position coordinate.

In the step S630, when it is detected that the second initial position coordinate is different from the second interaction position coordinate, scaling processing is performed for the second key image, and the scaled second key image is integrated to the second interaction position coordinate.

The first initial position coordinate may refer to three-dimensional position coordinates of the first key image in the first virtual scene instance. The second initial position coordinate may refer to three-dimensional position coordinates of the second key image in the initial virtual scene instance of the same-screen interaction recipient.

It may be detected whether the first initial position coordinate of the first key image is the same as the first interaction position coordinate, and it may be determined whether the scaling processing is required for the first key image according to the detection result. Specifically, when it is detected that the first initial position coordinate of the first key image is the same as the first interaction position coordinate, the first key image may be directly integrated to the first interaction position coordinate in the virtual scene template. However, when it is detected that the first initial position coordinate of the first key image is different from the first interaction position coordinate, the scaling processing may be performed for the first key image according to the first interaction position coordinate, and the scaled first key image may be integrated to the first interaction position coordinate. Likewise, it may be detected whether the second initial position coordinate of the second key image is the same as the second interaction position coordinate, if it is detected that the second initial position coordinate is the same as the second interaction position coordinate, the second key image may be integrated to the second interaction position coordinate, and otherwise, the scaling processing is performed for the second key image according to the second interaction position coordinate, and the scaled second key image is integrated to the second interaction position coordinate. Accordingly, the integration of the first key image and the second key image is achieved.

Figure 7:
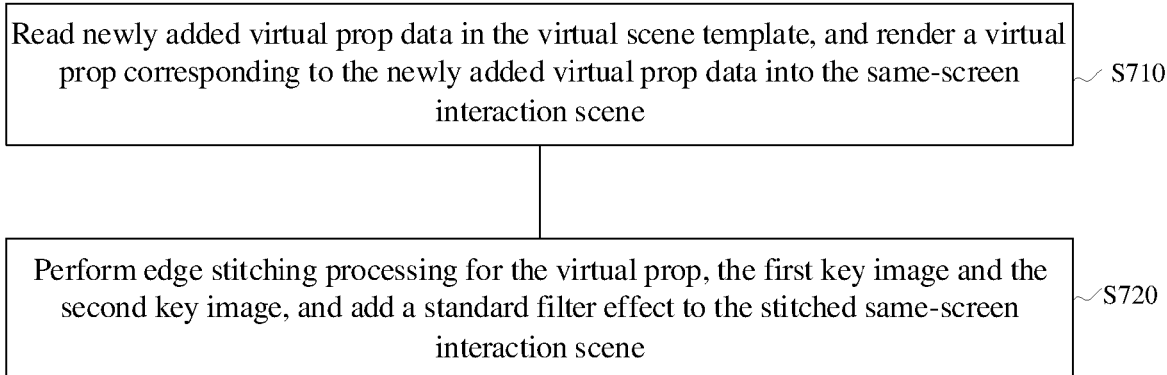
FIG. 7 schematically shows a schematic diagram of a flow of a method for processing a same-screen interaction scene according to some embodiments of the present disclosure.

FIG. 7 schematically shows a schematic diagram of a flow of a method for processing a same-screen interaction scene according to some embodiments of the present disclosure. Referring to FIG. 7, the method for processing the same-screen interaction scene may include steps S710 and S720.

In the step S710, newly added virtual prop data in the virtual scene template is read, and a virtual prop corresponding to the newly added virtual prop data is rendered to the same-screen interaction scene.

In the step S720, edge stitching processing is performed for the virtual prop, the first key image and the second key image, and a standard filter effect is added to the stitched same-screen interaction scene.

The newly added virtual prop data may refer to newly added virtual prop data in the virtual scene template relative to the first virtual scene instance and an initial virtual scene instance of the same-screen interaction recipient. For example, the virtual prop data in the first virtual scene instance is virtual prop data corresponding to a single sofa, the virtual prop data in the initial virtual scene instance is virtual prop data corresponding to a rocking chair, and then the newly added virtual prop data may be virtual prop data corresponding to a newly added seat that is different from the single sofa and the rocking chair. Alternatively, the newly added virtual prop data may also be other newly added virtual prop data in the virtual scene template relative to the first virtual scene instance and the initial virtual scene instance of the same-screen interaction recipient, which is not specifically limited in embodiments of the present disclosure.

The newly added virtual prop data in the virtual template may be read, and the virtual prop corresponding to the newly added virtual prop data may be rendered into the same-screen interaction scene to achieve the initial construction of the same-screen interaction scene. Further, edges corresponding to rendering objects, such as the virtual prop corresponding to the newly added virtual prop data in the virtual template, the second key image, the first key image in the same-screen interaction scene, a virtual prop or a pendant in the first virtual scene instance and the initial scene instance of the same-screen interaction recipient, may be added with the mask and Gaussian blur processing, which avoids that the anchor character and the scene prop are too abrupt when touching the edge. Then the integrated same-screen interaction scene is obtained.

In an example embodiment of the present disclosure, since respective filter effects in the first virtual scene instance and the initial scene instance of the same-screen interaction recipient may be different, in order to unify a style of the same-screen interaction scene, the standard filter effect may be added to the final integrated same-screen interaction scene, which improves the reality of the same-screen interaction scene.

In an example embodiment of the present disclosure, a first audio data stream may be collected, a second audio data stream of the same-screen interaction recipient may be obtained, the first audio data stream and the second audio data stream may be synchronized to the same-screen interaction scene through the target virtual scene instance to generate a same-screen live video stream corresponding to the same-screen interaction scene.

The first audio data stream may refer to an audio data stream collected by the terminal device of the same-screen interaction initiator. The second audio data stream may refer to an audio data stream collected by the terminal device of the same-screen interaction recipient. The same-screen live video stream may refer to a live data stream obtained by synchronizing, through the target virtual scene instance, the first audio data stream and the second audio data stream to the same-screen interaction scene.

The audio data streams may be collected by respective terminal devices of same-screen interaction participants, and respective audio data streams may be synchronized to the same-screen interaction scene through the target virtual scene instance to generate the same-screen live video stream. For example, the first audio data stream may be collected by the terminal device of the same-screen interaction initiator, the second audio data stream collected by the terminal device of the same-screen interaction recipient may be received, and then the first audio data stream and the second audio data stream may be synchronized to the same-screen interaction scene through the target virtual scene instance to generate the same-screen live video stream.

In an example embodiment of the present disclosure, a parallel polling switching manner may be used to play the same-screen live video stream and current live data streams of respective same-screen interaction participants. Specifically, terminals of the respective same-screen interaction participants may detect whether there is a playback requirement for an initial virtual scene instance for playing the current live data stream and the target virtual scene instance for playing the same-screen live video stream. If it is detected that there is a requirement for playing the current live data stream, the current live data stream may be played through the initial virtual scene instance. If it is detected that there is a requirement for playing the same-screen live video stream, the initial virtual scene instance will be switched to the target virtual scene instance to play the same-screen live video stream through the target virtual scene instance, which improves the diversity of the live content in the virtual live streaming scene.

FIG. 8 schematically shows a schematic diagram of a flow of a method for processing an interaction result according to some embodiments of the present disclosure. Referring to FIG. 8, the method for processing the interaction result may include steps S810 to S830.

In the step S810, an interaction operation is identified, and an interaction result corresponding to the interaction operation is determined.

In the step S820, display type data of the interaction result in the same-screen interaction scene is read.

In the step S830, when it is detected that the display type data is separate display type data, a target anchor identity corresponding to responding to the interaction operation is determined, and the interaction result, the separate display type data and the target anchor identity are sent to the server to make the server display the interaction result to the live streaming client associated with the target anchor identity.

The display type data can refer to type data that determines a display mode of the interaction result. For example, the display type may be the separate display type data, or same-screen display type data. Alternatively, the display type data may also be other type data that determines the display mode of the interaction result, which is not specifically limited in embodiments of the present disclosure.

The target anchor identity may refer to an anchor identity that responds to the interaction operation in the same-screen interaction scene. For example, the target anchor identity may be an account of an anchor who responds to the interaction operation in the same-screen interaction scene, or a Media Access Control Address (MAC) of a terminal of the anchor who responds to the interaction operation in the same-screen interaction scene, or an International Mobile Equipment Identity (IMEI) serial number of the terminal of the anchor who responds to the interaction operation in the same-screen interaction scene. Alternatively, the target anchor identity may also be other anchor identities that respond to the interaction operation in the same-screen interaction scene, which is not specifically limited in embodiments of the present disclosure.

The interaction operation of the current user for a picture of the same-screen live video stream may be identified. For example, an interactive gesture of the current user for the picture of the same-screen live video stream is identified, or position coordinate data corresponding to a touch operation of the current user for the picture of the same-screen live video stream may also be identified. Then, the target anchor identity and an interaction logic corresponding to the interaction operation such as the interactive gesture or the position coordinate data are obtained, and the interaction result corresponding to the interaction operation is determined according to the interaction logic. Further, the display type data corresponding to the interaction result is read, and the interaction result is displayed on the live streaming terminal in a display mode corresponding to the detected display type data.

For example, an interaction operation of current user 1 giving a flower to an anchor with an anchor account A is detected, and an interaction logic corresponding to the interaction operation is obtained, so as to determine an interaction result corresponding to the interaction operation based on the interaction logic. For example, the interaction result may be a displaying flower special effect and a text special effect of the current user 1 giving the flower to the anchor with the anchor account A. Then, display type data corresponding to the interaction result may be read, and when it is detected that the display type data is the separate display type data, the anchor account A, the interaction result and the separate display type data may be sent to the server, so that the server can separately display, according to the separate display type data, the interaction result on the live streaming client associated with the anchor account A, so that the live streaming end of the anchor account A can display the displaying flower special effect and the text special effect of the current user 1 giving the flower to the anchor with the anchor account A. In addition, other users who enter the live room of the anchor account A can also see the flower special effect and the text special effect of the current user 1 giving the flower to the anchor with the anchor account A, improving the pertinence of the interaction between the current user and the anchor corresponding to the target anchor identity in the same-screen interaction scene. In addition, the interaction result may be displayed only on the live streaming end corresponding to the target anchor identity; without affecting other users' watching of live content of other anchors in the same-screen interaction scene, which improves the experience of other users watching the live content of other anchors in the same-screen interaction scene.

In an example embodiment of the present disclosure, when it is detected that the display type data of the interaction result is the same-screen display type data, the interaction result and the same-screen display type data may be sent to the server, so that the server can display the interaction result to the live streaming client associated with the anchor in the same-screen interaction scene.

The same-screen display type data may refer to type data for determining to display the interaction result to live streaming ends of all anchors in the same-screen interaction scene.

The display type data of the interaction result may be detected, and the display mode of the interaction result may be determined based on the detected display type data. For example, when it is detected that the display type of the interaction result is the same-screen display type data, the interaction result and the same-screen display type data may be sent to the server to make the server display the interaction result on the live streaming clients associated with all anchors in the same-screen interaction scene, so that all anchors in the same-screen interaction scene and all users who enter live rooms of the respective anchors can watch the interaction result, enhancing an interactive effect in the virtual live streaming scene and expanding the gameplay dimension.

For example, when an interaction operation of current user 1 confessing to an anchor with an anchor account B in the same-screen interaction scene is detected, level information of the current user 1 and an interaction logic corresponding to the interaction operation may be obtained. An interaction result of the current user 1 confessing to the anchor with the anchor account B is obtained through automatically matching based on the level information of the current user 1 and the interaction logic, such as a dynamic special effect of a virtual character image nicknamed the current user 1 kneeling on one knee and presenting a bouquet of roses with a diamond ring and a card to the anchor with the anchor account B. Further, when the display type data corresponding to the interaction result is obtained as the same-screen display type data by reading, the interaction result and the same-screen display type data may be sent to the server, so that the server can display the interaction result on the live streaming clients associated with all anchors in the same screen interaction scene. During this process, a user who has not entered the live room of the anchor with the anchor account B can also watch the live content of the anchor with the anchor account B, which realizes the current user's satisfaction of interacting with the anchor with the anchor account B, improves the personalized interactive experience of the current user 1, and enriching the live content in the live room of the anchor with the anchor account B in the same-screen interaction scene.

It should be noted that although various steps of the method of the present disclosure are described in a particular order in the figures, this is not required or implied that these steps must be performed in the particular order, or all the steps shown must be performed to achieve the desired result. Additionally or alternatively, certain steps may be omitted, a plurality of steps may be combined into one step, and/or one step may be decomposed into a plurality of steps and so on.

In addition, in an embodiment of the present disclosure, there is further provided a device for controlling same-screen interaction. Referring to FIG. 9, the device for controlling the same-screen interaction 900 includes: a same-screen interaction request module 910, a target virtual scene instance establishment module 920, a key image obtaining module 930, a same-screen interaction scene generation module 940, and a same-screen live video stream sending module 950. The same-screen interaction request module 910 is configured to respond to an initiation request for the same-screen interaction, and determine a same-screen interaction recipient that replies to the initiation request. The target virtual scene instance establishment module 920 is configured to call a virtual scene template corresponding to the initiation request, and establish a target virtual scene instance corresponding to the virtual scene template. The key image obtaining module 930 is configured to obtain a second key image corresponding to the same-screen interaction recipient and a first key image. The same-screen interaction scene generation module 940 is configured to obtain a same-screen interaction scene by performing, through the target virtual scene instance, integration processing for the first key image and the second key image, and generate a same-screen live video stream corresponding to the same-screen interaction scene. The a same-screen live video stream sending module 950 is configured to send he same-screen live video stream to a server to synchronize, through the server, the same-screen live video stream to a live streaming client.

In some embodiments of the present disclosure, based on the above solution, the device for controlling the same-screen interaction 900 includes a virtual scene template calling unit, and the virtual scene calling unit is configured to call a key image integration logic and virtual scene rendering data in the virtual scene template.

In some embodiments of the present disclosure, based on the above solution, the target virtual scene instance establishment module 920 further includes a target virtual scene instance establishment unit, and the target virtual scene instance establishment unit is configured to: obtain a second virtual scene instance by copying a first virtual scene instance configured to play a first live video stream; and based on the second virtual scene instance, establish the target virtual scene instance according to the key image integration logic and the virtual scene rendering data in the virtual scene template.

In some embodiments of the present disclosure, based on the above solution, the key image obtaining module 930 further includes a key image obtaining unit, and the key image obtaining unit is configured to: obtain a first idle frame by performing frame lock processing for the first live video stream, and obtain a second idle frame corresponding to the same-screen interaction recipient; and based on the target virtual scene instance, extract the first key image in the first idle frame, and extract the second key image in the second idle frame.

In some embodiments of the present disclosure, based on the above solution, the same-screen interaction scene generation module 940 includes a same-screen interaction scene generation unit, and the same-screen interaction scene generation unit is configured to: based on the target virtual scene instance, perform the integration processing for the first key image and the second key image according to the key image integration logic; and obtain the same-screen interaction scene by performing a rendering processing for a result of the integration processing in combination with the virtual scene rendering data.

In some embodiments of the present disclosure, based on the above solution, the same-screen interaction scene generation module 940 further includes a key image integration unit, and the key image integration unit is configured to: based on the target virtual scene instance, determine a first interaction position coordinate of the first key image and a second interaction position coordinate of the second key image according to the key image integration logic; and perform the integration processing for the first key image and the second key image through the first interaction position coordinate and the second interaction position coordinate.

In some embodiments of the present disclosure, based on the above solution, the device for controlling the same-screen interaction 900 further includes a data matching module, and the data matching module is configured to: identify first posture data of the first key image, and identify second posture data of the second key image; determine first profile data of the first interaction position coordinate, and second profile data of the second interaction position coordinate; integrate the first key image to the first interaction position coordinate when detecting that the first posture data matches the first profile data; and integrate the second key image to the second interaction position coordinate when detecting that the second posture data matches the second profile data.

In some embodiments of the present disclosure, based on the above solution, the device for controlling the same-screen interaction 900 further includes a data detection module, and the data detection module is configured to: read a first initial position coordinate, in the first virtual scene instance, of the first key image, and a second initial position coordinate, in an initial virtual scene instance of the same-screen interaction recipient, of the second key image; integrate the first key image to the first interaction position coordinate when detecting that the first initial position coordinate is the same as the first interaction position coordinate; and when detecting that the second initial position coordinate is different from the second interaction position coordinate, perform scaling processing for the second key image, and integrate the scaled second key image to the second interaction position coordinate.

In some embodiments of the present disclosure, based on the above solution, the device for controlling the same-screen interaction 900 further includes an image processing module, and the image processing module is configured to: read newly added virtual prop data in the virtual scene template, and render a virtual prop corresponding to the newly added virtual prop data into the same-screen interaction scene; and perform edge stitching processing for the virtual prop, the first key image and the second key image, and add a standard filter effect to the stitched same-screen interaction scene.

In some embodiments of the present disclosure, based on the above solution, the device for controlling the same-screen interaction 900 further includes a same-screen live video stream generation module, and the same-screen live video stream generation module is configured to collect a first audio data stream, and obtain a second audio data stream of the same-screen interaction recipient; and generate the same-screen live video corresponding to the same-screen interaction scene by synchronizing the first audio data stream and the second audio data stream to the target virtual scene instance.

In some embodiments of the present disclosure, based on the above solution, the same-screen live video stream sending module 950 further includes a display type data detection module, and the display type data detection module is configured to: identify an interaction operation and determine an interaction result corresponding to the interaction operation; read display type data of the interaction result in the same-screen interaction scene; and when detecting that the display type data is separate display type data, determine a target anchor identity corresponding to responding to the interaction operation, and send the interaction result, the separate display type data and the target anchor identity to the server to make the server display the interaction result to a live streaming client associated with the target anchor identity.

In some embodiments of the present disclosure, based on the above solution, the same-screen live video stream sending module 950 further includes a same-screen display type data determination unit, and the same-screen display type data determination unit is configured to: when detecting that the display type data is same-screen display type data, send the interaction result and the same-screen display type data to the server to make the server display the interaction result to a live streaming client associated with an anchor in the same-screen interaction scene.

Specific details of each module in the device for controlling the same-screen interaction have been described in detail in the corresponding method for controlling the same-screen interaction, which will not be repeated here.

It should be noted that although several modules or units of the device for controlling the same-screen interaction are mentioned in the above detailed description, such division of modules or units is not mandatory. In fact, features and functions of two or more of the modules or units described above may be embodied in one module or unit in accordance with embodiments of the present disclosure. Conversely, the features and functions of one module or unit described above may be further divided into a plurality of modules or units.

According to the device for controlling the same-screen interaction in embodiments of the present disclosure, on the one hand, the virtual scene template corresponding to the initiation request for the same-screen interaction can be called, and the target virtual scene instance corresponding to the virtual scene template can be established, and the first key image and the second key image are integrated together through the target virtual scene instance to generate the same-screen interaction scene, and in turn obtain, through rendering, a picture where a plurality of same-screen interaction participants perform same-screen interaction in the same virtual scene, which improves the diversity of the virtual live streaming scene; on the other hand, the same-screen live video stream can be generated and the same-screen live video stream is synchronized to the live streaming client through the server, so that a user of the live streaming client can watch the live streaming of the plurality of participants in the same-screen interaction scene at the same time, which improves a use experience of the user watching the virtual live streaming scene.

In addition, in an embodiment of the present disclosure, there is further provided an electronic device capable of implementing the above method for controlling the same-screen interaction.

Those skilled in the art can understand that various aspects of the present disclosure may be implemented as a system, a method, or a program product. Therefore, various aspects of the present disclosure can be embodied in the following forms; a complete hardware implementation, a complete software implementation (including firmware, microcode, etc.), or a combination of hardware and software implementations, which can be collectively referred to as "circuit", "module", or "system".

An electronic device 1000 according to such an embodiment of the present disclosure is described below with reference to FIG. 10. The electronic device 1000 shown in FIG. 10 is only an example and should not bring any limitations to functions and a scope of use of embodiments of the present disclosure.

Figure 10:
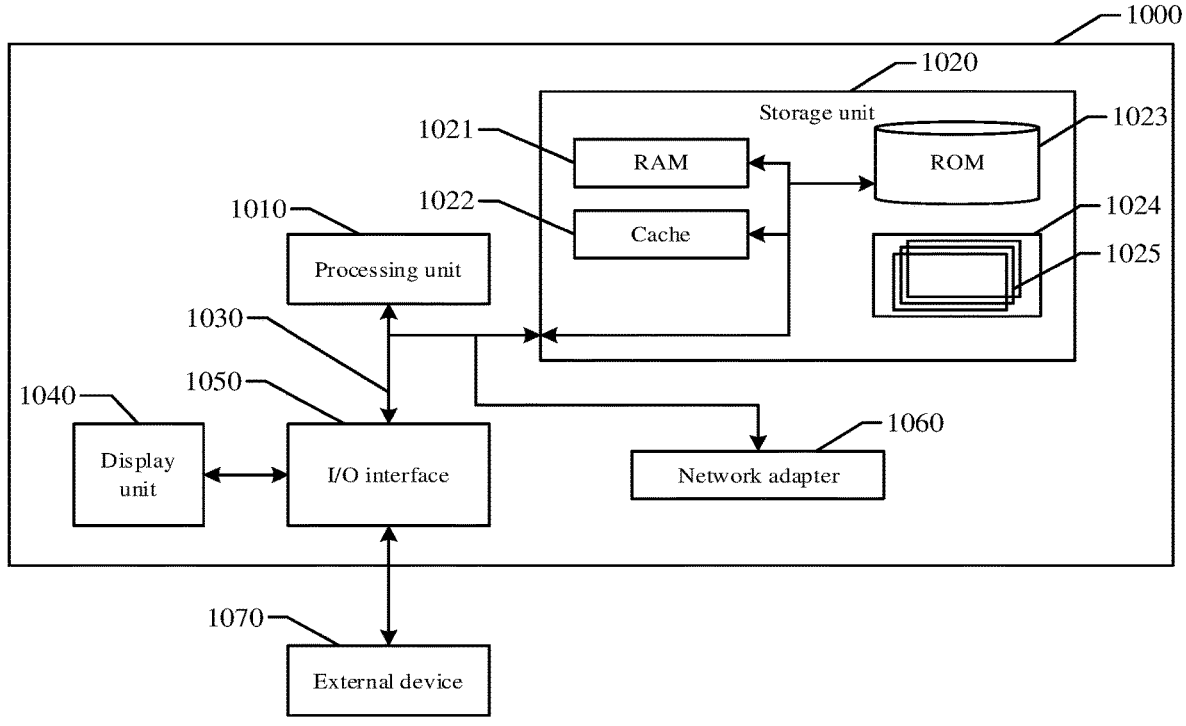
FIG. 10 schematically shows a structural diagram of a computer system of an electronic device according to some embodiments of the present disclosure.

As shown in FIG. 10, the electronic device 1000 takes the form of a general-purpose computing device. Components of the electronic device 1000 may include, but are not limited to: at least one processing unit 1010, at least one storage unit 1020, a bus 1030 connecting different system components (including the storage unit 820 and the processing unit 1010), and a display unit 1040.

The storage unit stores program codes, and the program codes may be executed by the processing unit 1010, so that the processing unit 1010 performs the following method steps:

responding to an initiation request for the same-screen interaction, and determining a same-screen interaction recipient that replies to the initiation request; calling a virtual scene template corresponding to the initiation request, and establishing a target virtual scene instance corresponding to the virtual scene template; obtaining a second key image corresponding to the same-screen interaction recipient and a first key image; obtaining a same-screen interaction scene by performing, through the target virtual scene instance, integration processing for the first key image and the second key image, and generating a same-screen live video stream corresponding to the same-screen interaction scene; and sending the same-screen live video stream to a server to synchronize, through the server, the same-screen live video stream to a live streaming client.

In some embodiments of the present disclosure, based on the above solution, the virtual scene template includes a key image integration logic and virtual scene rendering data.

In some embodiments of the present disclosure, based on the above solution, establishing the target virtual scene instance corresponding to the virtual scene template includes: copying a first virtual scene instance configured to play a first live video stream, and obtaining a second virtual scene instance; and based on the second virtual scene instance, establishing the target virtual scene instance according to the key image integration logic and the virtual scene rendering data in the virtual scene template.

In some embodiments of the present disclosure, based on the above solution, obtaining the first key image and the second key image corresponding to the same-screen interaction recipient includes: performing frame lock processing for the first live video stream, obtaining a first idle frame, and obtaining a second idle frame corresponding to the same-screen interaction recipient; and based on the target virtual scene instance, extracting the first key image in the first idle frame, and extracting the second key image in the second idle frame.

In some embodiments of the present disclosure, based on the above solution, performing the integration processing for the first key image and the second key image through the target virtual scene instance to obtain the same-screen interaction scene includes: based on the target virtual scene instance, performing the integration processing for the first key image and the second key image according to the key image integration logic; and performing a rendering processing for a result of the integration processing in combination with the virtual scene rendering data to obtain the same-screen interaction scene.

In some embodiments of the present disclosure, based on the above solution, based on the target virtual scene instance, performing the integration processing for the first key image and the second key image according to the key image integration logic includes: based on the target virtual scene instance, determining a first interaction position coordinate of the first key image and a second interaction position coordinate of the second key image according to the key image integration logic; and performing the integration processing for the first key image and the second key image through the first interaction position coordinate and the second interaction position coordinate.

In some embodiments of the present disclosure, based on the above solution, performing the integration processing for the first key image and the second key image through the first interaction position coordinate and the second interaction position coordinate includes: identifying first posture data of the first key image, and identifying second posture data of the second key image; determining first profile data of the first interaction position coordinate, and second profile data of the second interaction position coordinate; integrating the first key image to the first interaction position coordinate when detecting that the first posture data matches the first profile data; and integrating the second key image to the second interaction position coordinate when detecting that the second posture data matches the second profile data.

In some embodiments of the present disclosure, based on the above solution, performing the integration processing for the first key image and the second key image through the first interaction position coordinate and the second interaction position coordinate includes: reading a first initial position coordinate of the first key image in the first virtual scene instance, and a second initial position coordinate of the second key image in an initial virtual scene instance of the same-screen interaction recipient; integrating the first key image to the first interaction position coordinate when detecting that the first initial position coordinate is the same as the first interaction position coordinate; and when detecting that the second initial position coordinate is different from the second interaction position coordinate, performing scaling processing for the second key image, and integrating the scaled second key image to the second interaction position coordinate.

In some embodiments of the present disclosure, based on the above solution, the method further includes:

reading newly added virtual prop data in the virtual scene template, and rendering a virtual prop corresponding to the newly added virtual prop data into the same-screen interaction scene; and performing edge stitching processing for the virtual prop, the first key image and the second key image, and adding a standard filter effect to the stitched same-screen interaction scene.

In some embodiments of the present disclosure, based on the above solution, generating the same-screen live video stream corresponding to the same-screen interaction scene includes: collecting a first audio data stream, and obtaining a second audio data stream of the same-screen interaction recipient; and generating the same-screen live video corresponding to the same-screen interaction scene by synchronizing, through the target virtual scene instance, the first audio data stream and the second audio data stream to the same-screen interaction scene.

In some embodiments of the present disclosure, based on the above solution, the method further includes: identifying an interaction operation and determining an interaction result corresponding to the interaction operation; reading display type data of the interaction result in the same-screen interaction scene; and when detecting that the display type data is separate display type data, determining a target anchor identity corresponding to responding to the interaction operation, and sending the interaction result, the separate display type data and the target anchor identity to the server to make the server display the interaction result to the live streaming client associated with the target anchor identity.

In some embodiments of the present disclosure, based on the above solution, the method further includes: when detecting that the display type data is same-screen display type data, sending the interaction result and the same-screen display type data to the server to make the server display the interaction result to the live streaming client associated with the anchor in the same-screen interaction scene.

The specific embodiment content of the method for controlling the same-screen interaction run in the embodiment is also applicable to the aforementioned embodiment content of the method for controlling the same-screen interaction, and thus it will not be described again here.

In the method for controlling the same-screen interaction in embodiments of the present disclosure, the initiation request for the same-screen interaction is responded, and the same-screen interaction recipient that replies to the initiation request is determined; the virtual scene template corresponding to the initiation request is called, and the target virtual scene instance corresponding to the virtual scene template is established; the second key image corresponding to the same-screen interaction recipient and the first key image are obtained; the integration processing is performed for the first key image and the second key image through the target virtual scene instance to obtain the same-screen interaction scene, and the same-screen live video stream corresponding to the same-screen interaction scene is generated; and the same-screen live video stream is sent to the server to synchronize the same-screen live video stream to the live streaming client through the server. On the one hand, the virtual scene template corresponding to the initiation request for the same-screen interaction can be called, and the target virtual scene instance corresponding to the virtual scene template can be established, and the first key image and the second key image are integrated together through the target virtual scene instance to generate the same-screen interaction scene, and in turn obtain, through rendering, a picture where a plurality of same-screen interaction participants perform same-screen interaction in the same virtual scene, which improves the diversity of the virtual live streaming scene; on the other hand, the same-screen live video stream can be generated and the same-screen live video stream is synchronized to the live streaming client through the server, so that a user of the live streaming client can watch the live streaming of the plurality of participants in the same-screen interaction scene at the same time, which improves a use experience of the user watching the virtual live streaming scene.

The storage unit 1020 may include a readable medium in the form of a volatile storage unit, such as a random access storage unit (RAM) 1021 and/or a cache storage unit 1022, and may further include a read-only storage unit (ROM) 1023.

The storage unit 1020 may further include a program/utility tool 1024 having a set (at least one) of program modules 1025. Such program modules 1025 include, but are not limited to, an operating system, one or more application programs, other program modules, and program data. Each or some combination of these examples may include an implementation of a network environment.

The bus 1030 may be one or more of several types of bus structures, including a memory unit bus or a memory unit controller, a peripheral bus, a graphics acceleration port, a processing unit, or a local area bus using any bus structure in a variety of bus structures.

The electronic device 1000 may also communicate with one or more external devices 1070 (such as a keyboard, a pointing device, a Bluetooth device, etc.), and may also communicate with one or more devices that enable a user to interact with the electronic device 1000, and/or may also communicate with any device (such as a router, a modem) that can enable the electronic device 1000 to interact with one or more other computing devices. Such communication may be performed through an input/output (I/O) interface 1050. Moreover, the electronic device 1000 may also communicate with one or more networks (such as a local area network (LAN), a wide area network (WAN), and/or a public network, such as the Internet) through the network adapter 1060. As shown in the figure, the network adapter 1060 communicates with other modules of the electronic device 1000 through the bus 1030. It should be understood that although not shown in the figure, other hardware and/or software modules may be used in conjunction with the electronic device 1000, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein may be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the method according to embodiments of the present disclosure.

In an embodiment of the present disclosure, there is further provided a non-transitory computer-readable storage medium having a program product stored thereon which capable of implementing the method described above in this specification is stored. The computer program, when run by the processor, implements the following method steps:

responding to an initiation request for the same-screen interaction, and determining a same-screen interaction recipient that replies to the initiation request; calling a virtual scene template corresponding to the initiation request, and establishing a target virtual scene instance corresponding to the virtual scene template; obtaining a second key image corresponding to the same-screen interaction recipient and a first key image; obtaining a same-screen interaction scene by performing, through the target virtual scene instance, integration processing for the first key image and the second key image, and generating a same-screen live video stream corresponding to the same-screen interaction scene; and sending the same-screen live video stream to a server to synchronize, through the server, the same-screen live video stream to a live streaming client.

In some embodiments of the present disclosure, based on the above solution, the virtual scene template includes a key image integration logic and virtual scene rendering data.

In some embodiments of the present disclosure, based on the above solution, establishing the target virtual scene instance corresponding to the virtual scene template includes: copying a first virtual scene instance configured to play a first live video stream, and obtaining a second virtual scene instance; and based on the second virtual scene instance, establishing the target virtual scene instance according to the key image integration logic and the virtual scene rendering data in the virtual scene template.

In some embodiments of the present disclosure, based on the above solution, obtaining the first key image and the second key image corresponding to the same-screen interaction recipient includes: performing frame lock processing for the first live video stream, obtaining a first idle frame, and obtaining a second idle frame corresponding to the same-screen interaction recipient; and based on the target virtual scene instance, extracting the first key image in the first idle frame, and extracting the second key image in the second idle frame.

In some embodiments of the present disclosure, based on the above solution, performing the integration processing for the first key image and the second key image through the target virtual scene instance to obtain the same-screen interaction scene includes: based on the target virtual scene instance, performing the integration processing for the first key image and the second key image according to the key image integration logic; and performing a rendering processing for a result of the integration processing in combination with the virtual scene rendering data to obtain the same-screen interaction scene.

In some embodiments of the present disclosure, based on the above solution, based on the target virtual scene instance, performing the integration processing for the first key image and the second key image according to the key image integration logic includes: based on the target virtual scene instance, determining a first interaction position coordinate of the first key image and a second interaction position coordinate of the second key image according to the key image integration logic; and performing the integration processing for the first key image and the second key image through the first interaction position coordinate and the second interaction position coordinate.

In some embodiments of the present disclosure, based on the above solution, performing the integration processing for the first key image and the second key image through the first interaction position coordinate and the second interaction position coordinate includes: identifying first posture data of the first key image, and identifying second posture data of the second key image; determining first profile data of the first interaction position coordinate, and second profile data of the second interaction position coordinate; integrating the first key image to the first interaction position coordinate when detecting that the first posture data matches the first profile data; and integrating the second key image to the second interaction position coordinate when detecting that the second posture data matches the second profile data.

In some embodiments of the present disclosure, based on the above solution, performing the integration processing for the first key image and the second key image through the first interaction position coordinate and the second interaction position coordinate includes: reading a first initial position coordinate of the first key image in the first virtual scene instance, and a second initial position coordinate of the second key image in an initial virtual scene instance of the same-screen interaction recipient; integrating the first key image to the first interaction position coordinate when detecting that the first initial position coordinate is the same as the first interaction position coordinate; and when detecting that the second initial position coordinate is different from the second interaction position coordinate, performing scaling processing for the second key image, and integrating the scaled second key image to the second interaction position coordinate.

In some embodiments of the present disclosure, based on the above solution, the method further includes:

reading newly added virtual prop data in the virtual scene template, and rendering a virtual prop corresponding to the newly added virtual prop data into the same-screen interaction scene; and performing edge stitching processing for the virtual prop, the first key image and the second key image, and adding a standard filter effect to the stitched same-screen interaction scene.

In some embodiments of the present disclosure, based on the above solution, generating the same-screen live video stream corresponding to the same-screen interaction scene includes: collecting a first audio data stream, and obtaining a second audio data stream of the same-screen interaction recipient; and generating the same-screen live video corresponding to the same-screen interaction scene by synchronizing, through the target virtual scene instance, the first audio data stream and the second audio data stream to the same-screen interaction scene.

In some embodiments of the present disclosure, based on the above solution, the method further includes: identifying an interaction operation and determining an interaction result corresponding to the interaction operation; reading display type data of the interaction result in the same-screen interaction scene; and when detecting that the display type data is separate display type data, determining a target anchor identity corresponding to responding to the interaction operation, and sending the interaction result, the separate display type data and the target anchor identity to the server to make the server display the interaction result to the live streaming client associated with the target anchor identity;

In some embodiments of the present disclosure, based on the above solution, the method further includes: when detecting that the display type data is same-screen display type data, sending the interaction result and the same-screen display type data to the server to make the server display the interaction result to the live streaming client associated with the anchor in the same-screen interaction scene.

The specific embodiment content of the method for controlling the same-screen interaction run in the embodiment is also applicable to the aforementioned embodiment content of the method for controlling the same-screen interaction, and thus it will not be described again here.

In the method for controlling the same-screen interaction in embodiments of the present disclosure, the initiation request for the same-screen interaction is responded, and the same-screen interaction recipient that replies to the initiation request is determined; the virtual scene template corresponding to the initiation request is called, and the target virtual scene instance corresponding to the virtual scene template is established; the second key image corresponding to the same-screen interaction recipient and the first key image are obtained; the integration processing is performed for the first key image and the second key image through the target virtual scene instance to obtain the same-screen interaction scene, and the same-screen live video stream corresponding to the same-screen interaction scene is generated; and the same-screen live video stream is sent to the server to synchronize the same-screen live video stream to the live streaming client through the server. On the one hand, the virtual scene template corresponding to the initiation request for the same-screen interaction can be called, and the target virtual scene instance corresponding to the virtual scene template can be established, and the first key image and the second key image are integrated together through the target virtual scene instance to generate the same-screen interaction scene, and in turn obtain, through rendering, a picture where a plurality of same-screen interaction participants perform same-screen interaction in the same virtual scene, which improves the diversity of the virtual live streaming scene; on the other hand, the same-screen live video stream can be generated and the same-screen live video stream is synchronized to the live streaming client through the server, so that a user of the live streaming client can watch the live streaming of the plurality of participants in the same-screen interaction scene at the same time, which improves a use experience of the user watching the virtual live streaming scene.

In some embodiments of the present disclosure, various aspects of the present disclosure may also be implemented in the form of a program product, which includes program codes. When the program product is run on a terminal device, the program code is used to cause the terminal device to perform steps according to various embodiments of the present disclosure described in the above-mentioned "Example Method" section of this specification.

Figure 11:
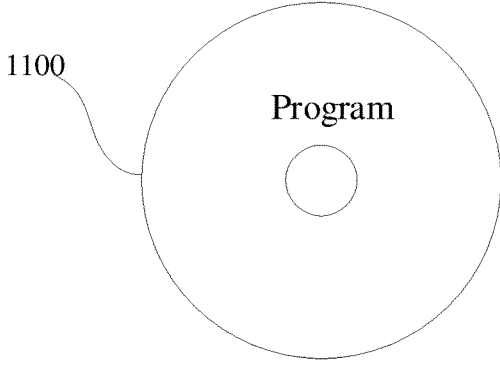
FIG. 11 schematically shows a schematic diagram of a non-transitory computer-readable storage medium according to some embodiments of the present disclosure.

Referring to FIG. 11, a program product 1100 for implementing the above-mentioned method for controlling the same-screen interaction according to an embodiment of the present disclosure is described. The program product 1100 may take the form of a portable Compact Disc Read-Only Memory (CD-ROM) and include program codes, and may be run on a terminal device, such as a personal computer. However, the program product of the present disclosure is not limited thereto. The readable storage medium herein may be any tangible medium containing or storing a program, and the program may be used by an instruction execution system, an apparatus, or a device, or the program may be used in combination with the instruction execution system, the apparatus, or the device.

The program product may be any combination of one or more readable mediums. The readable medium may be a readable signal medium or a readable storage medium. The readable storage medium may be, for example, but is not limited to, electronic, magnetic, optical, electromagnetic, infrared, or a semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure may be written in any combination of one or more programming languages, which include object-oriented programming languages, such as Java, C++, and so on. The programming languages also include conventional procedural programming language, such as "C" or a similar programming language. The program codes may be executed entirely on the user computing device, may be executed partly on the user device, may be executed as an independent software package, may be executed partly on the user computing device and partly on a remote computing device, or may be executed entirely on the remote computing device or server. In the case of a remote computing device, the remote computing device may be connected to the user computing device through any kind of network, including a local area network (LAN) or a wide area network (WAN), or the remote computing device may be connected to an external computing device, for example, by the Internet provided by the Internet service providers.

In addition, the above drawings are merely schematic descriptions of processes included in the methods according to embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in a plurality of modules, for example.

Through the description of the foregoing embodiments, those skilled in the art can easily understand that the example embodiments described herein may be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a touch terminal, or a network device, etc.) to execute the method according to embodiments of the present disclosure.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structure that has been described above and shown in the drawings, and various modifications and changes may be made without departing from the scope of the present disclosure. The scope of the disclosure is only defined by the appended claims.

What is claimed is:

1. A method for controlling same-screen interaction, comprising:

responding to an initiation request for the same-screen interaction, and determining a same-screen interaction recipient, wherein the same-screen interaction recipient replies to the initiation request;

calling a virtual scene template corresponding to the initiation request, and establishing a target virtual scene corresponding to the virtual scene template;

obtaining a second key image corresponding to the same-screen interaction recipient and a first key image;

obtaining a same-screen interaction scene by performing, through the target virtual scene, integration processing for the first key image and the second key image, and generating a same-screen live video stream corresponding to the same-screen interaction scene; and sending the same-screen live video stream to a server to synchronize, through the server, the same-screen live video stream to a live streaming client;

wherein the virtual scene template comprises a key image integration logic and virtual scene rendering data;

wherein establishing the target virtual scene instance corresponding to the virtual scene template comprises:

obtaining a second virtual scene by copying a first virtual scene configured to play a first live video stream; and based on the second virtual scene, establishing the target virtual scene according to the key image integration logic and the virtual scene rendering data in the virtual scene template;

wherein obtaining the second key image corresponding to the same-screen interaction recipient and the first key image comprises:

obtaining a first idle frame by performing frame lock processing for the first live video stream, and obtaining a second idle frame corresponding to the same-screen interaction recipient; and based on the target virtual scene, extracting the first key image in the first idle frame, and extracting the second key image in the second idle frame.

2. The method according to claim 1, wherein obtaining the same-screen interaction scene by performing, through the target virtual scene, the integration processing for the first key image and the second key image comprises:

based on the target virtual scene, performing the integration processing for the first key image and the second key image according to the key image integration logic; and obtaining the same-screen interaction scene by performing a rendering processing for a result of the integration processing in combination with the virtual scene rendering data.

3. The method according to claim 2, wherein based on the target virtual scene performing the integration processing for the first key image and the second key image according to the key image integration logic comprises:

based on the target virtual scene, determining a first interaction position coordinate of the first key image and a second interaction position coordinate of the second key image according to the key image integration logic; and performing the integration processing for the first key image and the second key image through the first interaction position coordinate and the second interaction position coordinate.

4. The method according to claim 3, wherein performing the integration processing for the first key image and the second key image through the first interaction position coordinate and the second interaction position coordinate comprises:

identifying first posture data of the first key image, and identifying second posture data of the second key image;

determining first profile data of the first interaction position coordinate, and second profile data of the second interaction position coordinate;

integrating the first key image to the first interaction position coordinate in response to detecting that the first posture data matches the first profile data; and integrating the second key image to the second interaction position coordinate in response to detecting that the second posture data matches the second profile data.

5. The method according to claim 3, wherein performing the integration processing for the first key image and the second key image through the first interaction position coordinate and the second interaction position coordinate comprises:

reading a first initial position coordinate, in the first virtual scene, of the first key image, and a second initial position coordinate, in an initial virtual scene of the same-screen interaction recipient, of the second key image;

integrating the first key image to the first interaction position coordinate in response to detecting that the first initial position coordinate is the same as the first interaction position coordinate; and in response to detecting that the second initial position coordinate is different from the second interaction position coordinate, performing scaling processing for the second key image, and integrating the scaled second key image to the second interaction position coordinate.

6. The method according to claim 1, wherein the method further comprises:

reading newly added virtual prop data in the virtual scene template, and rendering a virtual prop corresponding to the newly added virtual prop data into the same-screen interaction scene; and performing edge stitching processing for the virtual prop, the first key image and the second key image, and adding a standard filter effect to the stitched same-screen interaction scene.

7. The method according to claim 1, wherein generating the same-screen live video stream corresponding to the same-screen interaction scene comprises:

collecting a first audio data stream, and obtaining a second audio data stream of the same-screen interaction recipient; and generating the same-screen live video corresponding to the same-screen interaction scene by synchronizing, through the target virtual scene, the first audio data stream and the second audio data stream to the same-screen interaction scene.

8. The method according to claim 1, wherein the method further comprises:

identifying an interaction operation and determining an interaction result corresponding to the interaction operation;

reading display type data of the interaction result in the same-screen interaction scene; and in response to detecting that the display type data is separate display type data, determining a target anchor identity corresponding to responding to the interaction operation, and sending the interaction result, the separate display type data and the target anchor identity to the server to make the server display the interaction result to a live streaming client associated with the target anchor identity.

9. The method according to claim 8, wherein the method further comprises:

in response to detecting that the display type data is same-screen display type data, sending the interaction result and the same-screen display type data to the server to make the server display the interaction result to a live streaming client associated with an anchor in the same-screen interaction scene.

10. An electronic device, comprising:

a processor; and a memory having computer-readable instructions stored thereon, wherein the computer-readable instructions, when executed by the processor, implement:

responding to an initiation request for the same-screen interaction, and determining a same-screen interaction recipient that replies to the initiation request;

calling a virtual scene template corresponding to the initiation request, and establishing a target virtual scene corresponding to the virtual scene template;

obtaining a second key image corresponding to the same-screen interaction recipient and a first key image;

obtaining a same-screen interaction scene by performing, through the target virtual scene, integration processing for the first key image and the second key image, and generating a same-screen live video stream corresponding to the same-screen interaction scene; and sending the same-screen live video stream to a server to synchronize, through the server, the same-screen live video stream to a live streaming client;

wherein the virtual scene template comprises a key image integration logic and virtual scene rendering data;

obtaining a second virtual scene by copying a first virtual scene configured to play a first live video stream; and based on the second virtual scene, establishing the target virtual scene according to the key image integration logic and the virtual scene rendering data in the virtual scene template;

obtaining a first idle frame by performing frame lock processing for the first live video stream, and obtaining a second idle frame corresponding to the same-screen interaction recipient; and based on the target virtual scene, extracting the first key image in the first idle frame, and extracting the second key image in the second idle frame.

11. A non-transitory computer-readable storage medium having a computer program stored thereon, wherein the computer program, when executed by a processor, implements:

responding to an initiation request for the same-screen interaction, and determining a same-screen interaction recipient that replies to the initiation request;

calling a virtual scene template corresponding to the initiation request, and establishing a target virtual scene corresponding to the virtual scene template;

obtaining a second key image corresponding to the same-screen interaction recipient and a first key image;

obtaining a same-screen interaction scene by performing, through the target virtual scene, integration processing for the first key image and the second key image, and generating a same-screen live video stream corresponding to the same-screen interaction scene; and sending the same-screen live video stream to a server to synchronize, through the server, the same-screen live video stream to a live streaming client;

wherein the virtual scene template comprises a key image integration logic and virtual scene rendering data;

obtaining a second virtual scene by copying a first virtual scene configured to play a first live video stream; and based on the second virtual scene, establishing the target virtual scene according to the key image integration logic and the virtual scene rendering data in the virtual scene template;

obtaining a first idle frame by performing frame lock processing for the first live video stream, and obtaining a second idle frame corresponding to the same-screen interaction recipient; and based on the target virtual scene, extracting the first key image in the first idle frame, and extracting the second key image in the second idle frame.

\* \* \* \* \*